US012274664B1

(12) United States Patent
Hekimian

(10) Patent No.: US 12,274,664 B1
(45) Date of Patent: Apr. 15, 2025

(54) SYSTEM AND METHOD FOR IMPROVING MENTAL MAPPING SKILLS FOR ENHANCED ORIENTATION AND MOBILITY FOR THE VISUALLY IMPAIRED

(71) Applicant: Christopher Hekimian, Germantown, MD (US)

(72) Inventor: Christopher Hekimian, Germantown, MD (US)

( * ) Notice: Subject to any disclaimer, the term of this patent is extended or adjusted under 35 U.S.C. 154(b) by 99 days.

(21) Appl. No.: 18/123,902

(22) Filed: Mar. 20, 2023

(51) Int. Cl.
| | | |
|---|---|---|
| *A61H 3/06* | (2006.01) | |
| *G01C 21/20* | (2006.01) | |
| *G01S 1/72* | (2006.01) | |
| *G01S 13/74* | (2006.01) | |
| *G06F 3/16* | (2006.01) | |
| *G08B 6/00* | (2006.01) | |
| *G08G 1/005* | (2006.01) | |
| *G09B 21/00* | (2006.01) | |
| *H04W 4/02* | (2018.01) | |
| *H04W 4/80* | (2018.01) | |

(52) U.S. Cl.
CPC ............. *A61H 3/061* (2013.01); *A61H 3/066* (2013.01); *A61H 3/068* (2013.01); *G01C 21/20* (2013.01); *G01S 1/725* (2013.01); *G01S 13/74* (2013.01); *G06F 3/162* (2013.01); *G08B 6/00* (2013.01); *G08G 1/005* (2013.01); *G09B 21/006* (2013.01); *H04W 4/026* (2013.01); *H04W 4/80* (2018.02)

(58) Field of Classification Search
CPC ........ A61H 3/061; A61H 3/066; A61H 3/068; A61H 2003/063; A61H 2201/5058; G08B 6/00; G08G 1/005; G01S 1/725; G01S 13/74; G01C 21/20; H04W 4/026; H04W 4/80; G06F 3/162; G09B 21/006

USPC .......................................................... 348/62
See application file for complete search history.

(56) References Cited

U.S. PATENT DOCUMENTS

| | | | |
|---|---|---|---|
| 7,039,522 B2 * | 5/2006 | Landau | G01S 1/725 340/539.11 |
| 2005/0099291 A1 * | 5/2005 | Landau | G01S 1/725 340/988 |
| 2006/0129308 A1 * | 6/2006 | Kates | A61H 3/066 701/532 |

(Continued)

FOREIGN PATENT DOCUMENTS

DE 10246194 4/2004

OTHER PUBLICATIONS

Mandanici, M., et al., "The Task of Walking Straight as an Interactive Serious Game for Blind Children", EAI Endorsed Transactions on Serious Games, vol. 5, Issue 16, Sep. 2018.

(Continued)

*Primary Examiner* — John W Miller
*Assistant Examiner* — Sean N. Haiem
(74) *Attorney, Agent, or Firm* — Lieberman & Brandsdorfer, LLC

(57) ABSTRACT

Embodiments are provided for to a system, computer program product, and a method to support surveying a physical environment. Two or more secondary units are physically configured to receive a physical actuation. In response to the actuation, the secondary unit(s) are configured to emit an audible cue and to communicate an address of the actuated unit. Tools are provided to track the actuation and associated addresses, and in an embodiment lapsed time.

21 Claims, 9 Drawing Sheets

(56) References Cited

U.S. PATENT DOCUMENTS

| | | | |
|---|---|---|---|
| 2006/0254634 A1* | 11/2006 | Tucker | A45B 3/00 |
| | | | 135/65 |
| 2008/0170118 A1* | 7/2008 | Albertson | A61H 3/061 |
| | | | 348/46 |
| 2016/0084952 A1* | 3/2016 | Karlapalem | G01S 13/08 |
| | | | 342/118 |
| 2018/0113213 A1* | 4/2018 | Biffignani | G01S 15/93 |
| 2019/0186915 A1* | 6/2019 | Wiencrot | G01P 13/00 |
| 2020/0261302 A1* | 8/2020 | Mitra | A61H 3/066 |
| 2021/0154086 A1* | 5/2021 | Crosby | A61H 3/068 |
| 2021/0297826 A1* | 9/2021 | Volkerink | G01S 19/45 |
| 2022/0050194 A1* | 2/2022 | Macias | G01S 13/56 |
| 2022/0087890 A1* | 3/2022 | Rachel | A61H 3/061 |

OTHER PUBLICATIONS

Chamberlain, Merry-Noal, "American Printing House Sound Balls", Fall 2008.

* cited by examiner

SYSTEM AND METHOD FOR IMPROVING MENTAL MAPPING SKILLS FOR ENHANCED ORIENTATION AND MOBILITY FOR THE VISUALLY IMPAIRED

BACKGROUND

One or more of the present embodiments relate to a system, a related computer program product and a computer-implemented method directed at training an individual that is subject to a visual impairment. In certain exemplary embodiments, one or more of the present embodiments are directed to a solution configured to develop and enhance independent mobility skills for individuals subject to a visual impairment.

It is understood that visual acuity refers to clarity or sharpness of visions. There are different classifications or definitions within visual acuity, including contrast sensitivity, color, depth perception, and glare sensitivity. Similarly, visual impairments include low vision and blindness. Low vision refers to visual impairments that are less severe than blindness but impacts common or daily activities. Blindness technically refers to a total absence of vision.

Visually-impaired and blind individuals are faced with significant challenges with respect to mobility and with respect to fully understanding or comprehending their immediate surroundings. To be able to successfully navigate and function within an environment, it is to the benefit of the visually impaired person to be able to develop and reference an accurate mental map of their environment. Objects such as doors, windows, phones, computers, furniture, and floor coverings can be challenging to navigate for a visually impaired individual. Understanding their surroundings decreases the likelihood of collision with objects, enables greater functionality, reduces fear, frustration and improves confidence and independence. Accordingly, it is desirable to provide a solution that enables a visually impair individual to become familiar with their surroundings, including becoming familiar with distances and geometries between key objects within an environment.

SUMMARY

The embodiments include a system, a computer program product, and a method for enhancing independent mobility skills for individuals subject to a visual impairment. This Summary is provided to introduce a selection of representative concepts in a simplified form that is further described below in the Detailed Description. This Summary is not intended to identify key features or essential features of the claimed subject matter, nor is it intended to be used in any way that would limit the scope of the claimed subject matter.

In one aspect, a system is provided having at least first and second functional units, and an operatively coupled primary unit. The first functional unit is configured to convey a first output in response to receipt of a first physical actuation, and is further configured to selectively emit the first output in response to the first physical actuation. The second functional unit is configured to convey a second output in response to receipt of a second physical actuation, and is further configured to selectively emit the second output in response to the second physical actuation. The operatively coupled primary unit is configured to receive and evaluate the selectively emitted first output and second output to determine a match or non-match of the first and second outputs. A cue is emitted in response to determination of the match of the selectively emitted outputs. The cue comprises an audible format and/or a visual format. The issued cue is configured to convey an objective condition between the first and second outputs.

In another aspect, a computer program product is provided with a computer readable storage medium or media, and program code stored on the computer readable storage medium or media. The program code is executable by a computer processor and configured to convey a first output in response to receipt of a first physical actuation of a first functional unit, and is further configured to selectively emit the first output in response to the first physical actuation. The program code is configured to convey a second output in response to receipt of a second physical actuation of a second functional unit, and is further configured to selectively emit the second output in response to the second physical actuation. The program code is configured to receive and evaluate the selectively emitted first output and second output to determine a match or non-match of the first and second outputs. In response to determination of the match of the selectively emitted outputs includes the program code to issue a cue in an audible format and/or a visual format, the issued cue configured to convey an objective condition between the first and second outputs.

These and other features and advantages will become apparent from the following detailed description of the present exemplary embodiment(s), taken in conjunction with the accompanying drawings.

BRIEF DESCRIPTION OF THE SEVERAL VIEWS OF THE DRAWINGS

The drawings referenced herein form a part of the specification and are incorporated herein by reference. Features shown in the drawings are meant as illustrative of only some embodiments, and not of all embodiments, unless otherwise explicitly indicated.

DETAILED DESCRIPTION

Figure 1:
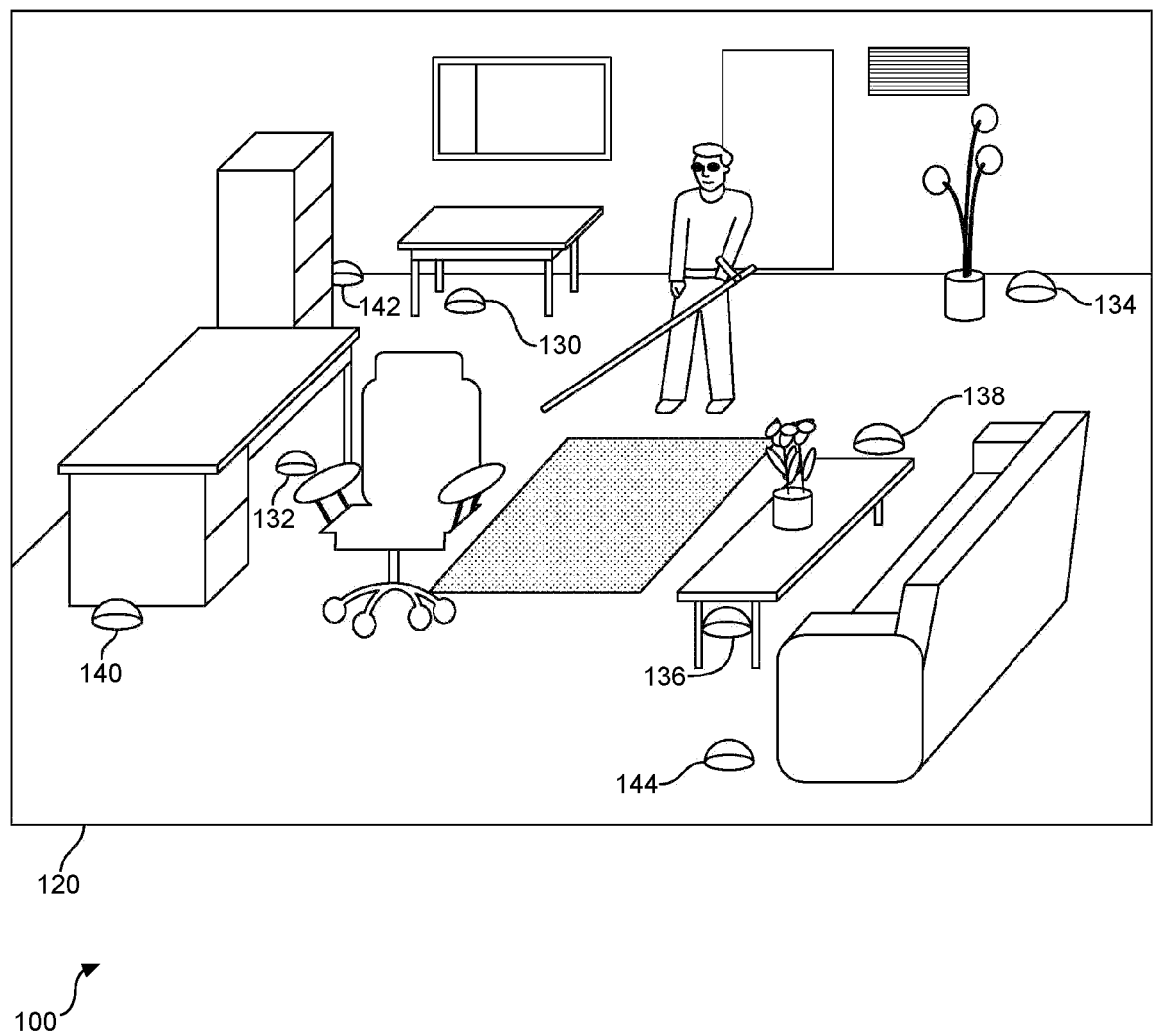
FIG. 1 depicts a system diagram illustrating an embodiment of a system to facilitate surveying a physical environment consistent with the new system and method for improving orientation and mobility skills for the visually impaired.

It will be readily understood that the components of the present embodiments, as generally described and illustrated in the Figures herein, may be arranged and designed in a wide variety of different configurations. Thus, the following detailed description of the exemplary embodiments of the apparatus, system, method, and computer program product, as presented in the Figures, is not intended to limit the scope of the embodiments, as claimed, but is merely representative of selected embodiments.

Reference throughout this specification to "a select embodiment," "one embodiment," "an exemplary embodiment," or "an embodiment" means that a particular feature, structure, or characteristic described in connection with the embodiment is included in at least one embodiment. Thus, appearances of the phrases "a select embodiment," "in one embodiment," "in an exemplary embodiment," or "in an embodiment" in various places throughout this specification are not necessarily referring to the same embodiment. The embodiments described herein may be combined with one another and modified to include features of one another. Furthermore, the described features, structures, or characteristics of the various embodiments may be combined and modified in any suitable manner.

The illustrated embodiments will be best understood by reference to the drawings, wherein like parts are designated by like numerals throughout. The following description is intended only by way of example, and simply illustrates certain selected embodiments of devices, systems, products, and processes that are consistent with the embodiments as claimed herein.

Fully-sighted people can rely on their eyesight to identify the locations of exits and objects within their environment. They can also rely on visual cues that they receive in order to understand where they are located within a room, e.g. an enclosed environment, or outdoor area, e.g. a non-enclosed environment. This kind of awareness is basic and trivial to the sighted individual. To the contrary, the visually-impaired individual tends to rely on a neurological analog of the environment, i.e., a mental map. The visually-impaired person will become familiar with distances and geometries between key objects within the mentally mapped environment to maintain awareness of locations and distances between objects.

Many assistive technologies and methods have been developed to help the visually-impaired locate potential hazards within an environment or to enhance their ability to navigate using a white cane. Regardless of the assistive technology or method intended to enhance the ability of a visually-impaired person to navigate and function within an environment, the core capability being exercised is in many cases related to the development, management and reference of some mental model of the immediate environment that the visually-impaired person constructs using their senses and high order reasoning techniques.

Key skills for developing and managing mental maps of a person's surroundings and environment include recognizing the gross shape of a room and large objects like furniture within the room. Large objects, doors, corners, and windows serve as landmarks that define the size and shape of an enclosed environment. In an exemplary embodiment, a similar mental process would apply to outdoor environments. Another key skill is directed at determining relative distances between objects within an environment, whether enclosed or non-enclosed, through careful control of orientation in conjunction with distance measurement through step counting. This process adds detail to the gross map of the surroundings. Leveraging non-visual cues within an environment in order to add detail and physical reference points within the mental model of the environment is another skill. Familiar sounds, moving air from an air vent, bright sunlight through a window, smells from a kitchen and the edges of carpeting can all serve as reference points to further define a space.

As shown and described herein, the system, computer program product, and method are configured to enable or teach skilled navigation using a white cane such that contact-feedback is received and used to further understand the environment. The embodiments shown and described herein are directed at a tool to train individuals afflicted by a visual impairment, with the training directed at developing and enhancing independent mobility skills. More specifically, the tool facilitates the ability for an individual with a visual impairment to survey a physical environment. It is understood that the system, computer program product, and method may be applied to non-visually impaired individuals as well, and in an exemplary embodiment, may be utilized as an interactive platform. As described below, the secondary unit(s) and/or the primary unit(s) are configured to generate one or more audible cues, e.g. non-visual cues, thereby facilitating guidance and instructions without requiring vision and sight. In an exemplary embodiment, the audible cues enables the secondary units, e.g. objects, to be located and tracked as location indicators within a mental map of the physical space conceived by the visually impaired subject and leveraged by the subject to inform the subjects movements within a set environment.

Referring to FIG. 1, an illustration (100) is provided to depict an embodiment of a system to facilitate surveying a physical environment consistent with the new method. As shown, the system includes a primary unit (110) and a plurality of secondary units, also referred to herein as functional units, positioned within the confines of an area (120), also referred to herein as a locale, and which in an embodiment may be an enclosed or non-enclosed space. Each of the secondary units is operatively coupled to the primary unit (110). By way of example, the secondary units are shown herein as $unit_0$ (130), $unit_1$ (132), $unit_2$ (134), $unit_3$ (136), $unit_4$ (138), $unit_5$ (140), $unit_6$ (142), and $unit_7$ (144). Although only eight secondary units are shown, this quantity of secondary units is for exemplary purposes and should not be considered limiting. The secondary units may operate individually, in pairs, or in groups. By way of a pairing example, $unit_0$ (130) and $unit_1$ (132) form a first pair, $unit_2$ (134) and $unit_3$ (136) form a second pair, $unit_4$ (138) and $unit_5$ (140) form a third pair, $unit_6$ (142) and $unit_7$ (144) form a fourth pair. Similarly, in another example where the secondary units function or operate in groups, $unit_0$ (130), $unit_1$ (132), $unit_2$ (134), and $unit_3$ (136) form a first group, and $unit_4$ (138), $unit_5$ (140), $unit_6$ (142), and $unit_7$ (144) form a second group. The secondary units are individually operatively coupled to the primary unit (110). In an exemplary embodiment, the primary unit (110) may be positioned internal or external to the space (120). For example, in an embodiment, the primary unit (110) may be wirelessly coupled to the secondary units, with the secondary units positioned in a first locale and the primary unit positioned in a second locale, with the first and second locales being separate locales. Accordingly, the primary unit and the secondary units are configured to be operatively and wirelessly coupled regardless of the locales in which they are positioned.

The placement of the secondary units in the space (120) is merely an example or an arrangement of secondary units. In an embodiment, the secondary units may be randomly placed within the space (120). Similarly, in an embodiment, the secondary units may be specifically placed in select locations within the space (120). For example, a pair of secondary units may be individually and non-randomly placed within the space (120) in an effort to require or solicit movement of an individual searching for the secondary units. As shown herein by way of example, the first pair of units, e.g. $unit_0$ (130), $unit_1$ (132), are individually shown positioned under separate objects, with $unit_0$ (130) positioned underneath a first object, e.g. $object_0$ (150), and $unit_1$ (132) positioned underneath a second object, e.g. $object_1$ (152). Similarly, the third pair of units, e.g. $unit_4$ (138) and $unit_5$ (140), are individually shown positioned adjacent to separate objects, with $unit_4$ (138) positioned adjacent to a third object, e.g. $object_2$ (154), and $unit_5$ (140) positioned adjacent to a fourth object, e.g. $object_3$ (156). In an embodiment, the placement of the secondary units is positioned to facilitate surveying of the space (120). Accordingly, whether positioned randomly or non-randomly, the secondary units are placed within the space (120) to facilitate measuring and learning characteristics associated with the space (120).

Figure 2:
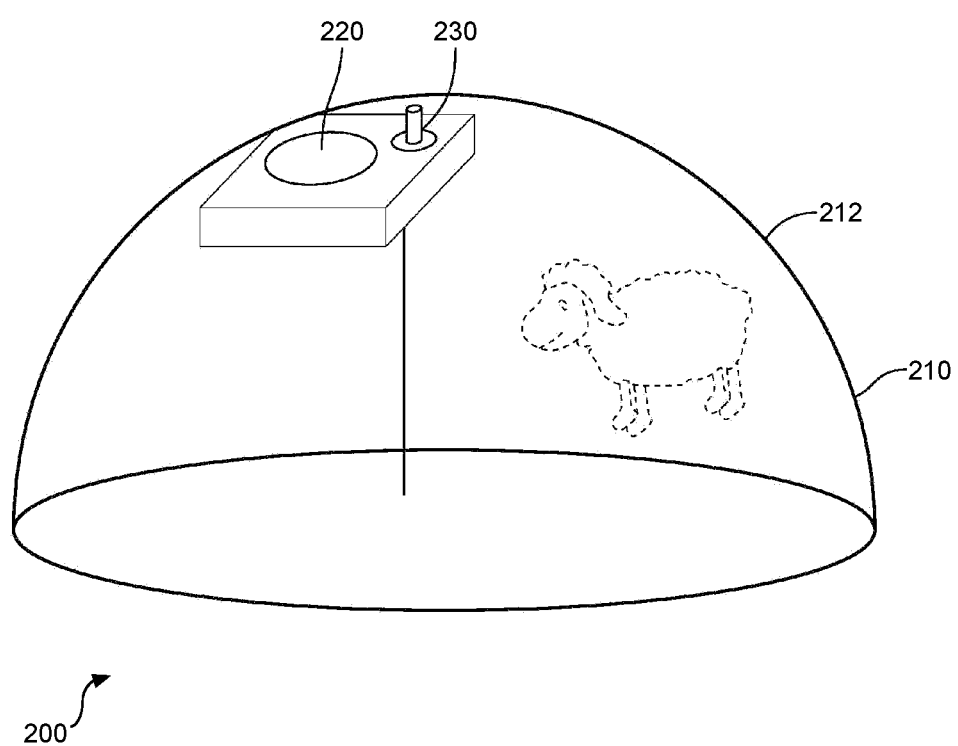
FIG. 2 depicts a diagram illustrating an embodiment of a secondary unit and its associated housing.

Referring to FIG. 2, a diagram (200) is provided to illustrate an embodiment of a secondary unit and its associated housing. As shown, the secondary unit housing is encompassed within a body (210) configured with an external shell or housing (212), hereinafter referred to collectively as a shell. In an embodiment, the external shell (212) has a convex shape, although this shape should not be considered limiting. Similarly, in an embodiment, the shell (212) is comprised or a rigid or semi-rigid material that is configured to be actuated in response to receipt and detection of a force or pressure without affecting the functional integrity of the shell (212) or the physical and operational components of the secondary unit. In an embodiment, the received actuation, such as, but not limited to, sound, vibration, force, pressure, etc. may be in the form of, actuation from a white cane or comparable device, such as a tapping or some form of interaction with or received by another object. The shell (212) is shown with a speaker (220) and a switch (230). The speaker (220) is configured to emit or project sound. In an exemplary embodiment, the speaker (220) is configured to emit one or more sounds, with different sounds associated with select criteria or circumstances. For example, the speaker (220) may be configured to emit a first sound for a first set of criteria and a second sound for a second set of criteria. Details of the different sounds associated with the secondary unit and their corresponding criteria are described in detail below.

Each secondary unit is individually configured with a switch, shown herein as (230). The speaker (220) and the switch (230) are both operatively coupled to functional components of the secondary unit that are shown and described in FIG. 3. When the switch (230) is in an inactive state, e.g. off, the secondary unit is effectively inactive. However, when the switch (230) is in an active state, e.g. on, the secondary unit is active and operatively coupled to and registered with the primary unit, e.g. primary unit (110).

As described above, the secondary units are operatively coupled to the primary unit, either individually or in pairs or groups. In an exemplary embodiment, each secondary unit has a digital address that is registered or registerable with the primary device. For example, secondary $unit_0$ (130) is configured with a first address (not shown) and secondary $unit_1$ (132) is configured with a second address (not shown), with the first and second addresses being different. The first and second addresses are registered with the primary unit, e.g. (110), thereby making each of the secondary units individually identifiable by the primary unit.

Figure 3:
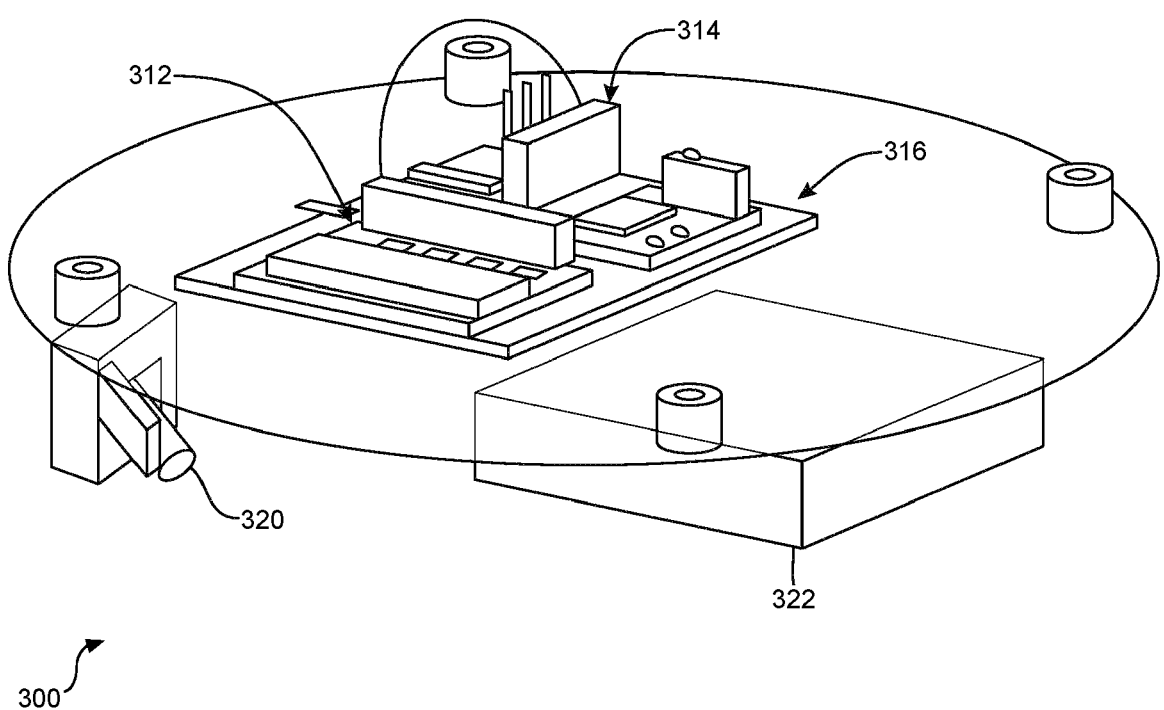
FIG. 3 depicts a diagram illustrating an embodiment of functional components of the secondary unit(s).

Referring to FIG. 3, a diagram (300) is provided to illustrate an embodiment of the secondary unit (310) and its functional components. As shown, the secondary unit (310) is provided with functional components in the form of a microcontroller (312) operatively coupled to a transmitter (314), a sound card (316), a microphone (320), and a power supply (322). In an embodiment, an accelerometer may be employed in place of or in addition to the microphone (320). It is understood in the art that a microcontroller is a computer present in an integrated circuit dedicated to perform a task and execute an application. The microcontroller (312) contains memory, programmable peripherals and a processor. In an embodiment, the secondary unit (310) may be configured with additional or alternative components to support and enable the functionality of the secondary unit, and as such configuration of the secondary unit(s) should not be limited to the components shown and described herein. As further shown, the functional components are contained or enveloped within the shell or physical cover, shown as (220) in FIG. 2, to form an enclosure. In an embodiment, and as described in FIG. 2, the physical cover may be in the form of a convex shell, although this configuration should not be considered limiting. In an exemplary embodiment, the physical cover (220) is configured as a protective element for the functional components of the unit. Additionally, the physical cover (220) is configured to receive a force, pressure, or some form of physical actuation, while also having resiliency. In an embodiment, one or more of the components of the secondary unit (310) may be replaced, substituted, or supplemented with one or more alternative or additional components that support and enable the functionality of the secondary unit. The components of the secondary unit (310) shown and described herein should not be considered limiting. Accordingly, each secondary unit is a self-contained enclosure.

It is understood in the art that a physical interaction between two objects may create an audible output. The microphone (320) is configured with a diaphragm to detect sound, and to convert the detected sound into electrical current. In an embodiment wherein an accelerometer or an alternative component is utilized in place of the microphone (320), the functionality of sound detection and sound conversion is supported and enabled by the accelerometer. In an embodiment, the physical cover (220) is comprised of a material that when subject to impact, such as an actuation or contact from a secondary object, a sound is generated. For example, when a white cane touches the physical cover (220), a sound is generated. Sound is understood in the art as a vibration that travels through air, or another medium, and can be detected. The sound card (316), which is operatively coupled to the microphone (320), is configured to input, process, and deliver sound, e.g. generate an audio signal. In an exemplary embodiment, the generated audio signal is configured to be received and processed by an operatively coupled primary unit, also referred to herein as a control unit. Details of the primary unit are shown and described in FIG. 4. In an embodiment, each secondary unit has an assigned serial number or registration number. In an exemplary embodiment, the assigned serial or registration number is unique to each secondary unit. In an embodiment, as a response to the received actuation or contact, the assigned serial or registration number is transmitted to the primary unit, whether positioned local to or remote from the locale of the secondary unit(s). In an exemplary embodiment, the transmission of the assigned serial or registration number is conducted silently and wirelessly. The signal projection within the locale of the placement of the secondary unit(s) provides an audible cue within the locale, and the signal projection to the primary unit enables registration of the secondary unit actuation.

The sound associated with the audio signal generated by the secondary unit is unique or semi-unique to the secondary unit. For example, in an embodiment, each secondary unit may be configured or programmed with a sound that is unique to that unit. Similarly, in an embodiment, a pair or a group of secondary units may be configured or programmed with a sound that is unique to the secondary unit pair or group. The sound card (316) is configured to emit sound that is audible in nature so that it is capable of being heard within a set proximity. For example, in an embodiment, the secondary unit may receive a tapping or force, such as that received from actuation by a white cane or another device, and in response the secondary unit emits an audible sound that is assigned to the secondary unit. In this example, the sound emitted from the secondary unit functions as an indicator to the entity in possession of the cane. In an exemplary embodiment, the emitted sound may imply or suggest a positive or negative meaning. Details of the sound implication are shown and described in FIG. 5. Regardless of the connotation of the emitted sound, the emitted sound is configured to be received and processed by the operatively coupled primary unit.

Two or more secondary units may be configured or arranged in a cooperative relationship. Details of the cooperative relationship are shown and described in FIG. 5. By way of an example, an individual with a visual impairment uses their cane, e.g. white cane, to navigate within the environment to search for secondary units, by group. When a secondary unit is found, and tapped with the cane, it emits a distinctive sound that allows the subject to recognize it and consider its location relative to the various non-visual cues and distances and orientations between them that the subject experienced during the search process. Disciplined knowledge and management of the mental map that the subject has developed and continues to refine during the exercise, facilitates the process of finding all of the matching groups of secondary units. This process will ultimately reinforce the sensing, attention, and cognition skills required by the visually impaired in order to navigate more safely and with confidence in any new environment. Non-visual cues within the environment can include sounds, smells, objects, temperature gradients, drafts and floor covering textures and discontinuities. In an exemplary embodiment, the sounds emitted from the individual secondary units serve to facilitate a process of identification and hence, matching or grouping with one or more additional secondary units within that environment. Details of the matching are shown and described in FIG. 6. The system and method can also be used by a sighted person wearing a blindfold in order to improve their own sense of spatial awareness. In an exemplary embodiment, two or more secondary units may be configured or programmed to emit the same audible sound or a complementary audible sound, effectively creating a pair or grouping of secondary units based on the sounds that they emit when triggered by a tap by the cane.

Figure 4:
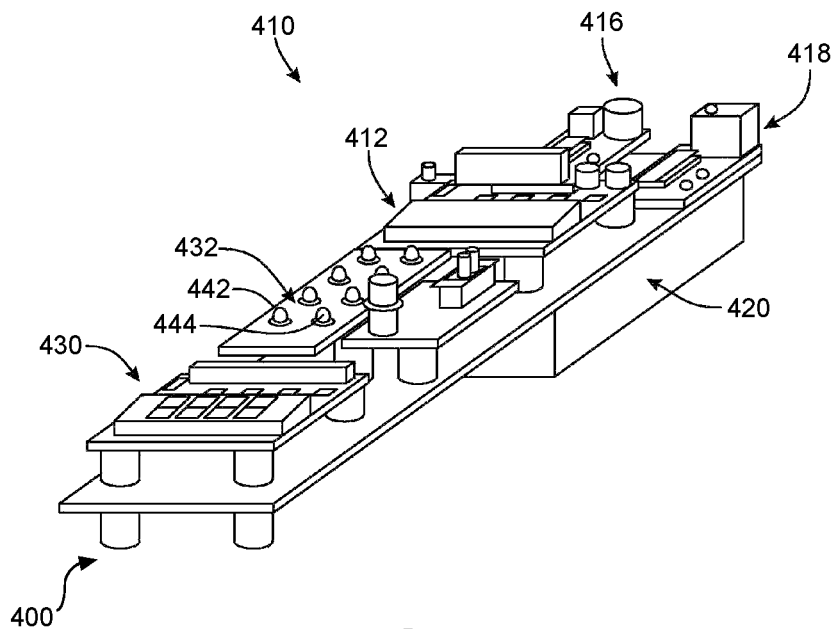
FIG. 4 depicts a diagram illustrating an embodiment of functional components of the primary unit.

Referring to FIG. 4, a diagram (400) is provided to illustrate an embodiment of a primary unit (410) and its functional components. As shown, the primary unit (410) is provided with functional components in the form of a microcontroller (412) operatively coupled to a sound card (416), a receiver (418), and a power supply (420), a timer (430) and a visual display (432). In an embodiment, the primary unit (410) may be configured with additional or alternative components to support and enable the functionality of the primary unit (410). The receiver (418) is configured to accept and process one or more signals. In an exemplary embodiment, the receiver (418) is programmed to detect and process a signal from one or more operatively coupled secondary units. The display (432) is shown herein configured with an array of illuminating elements. In an embodiment, the array is configured with light emitting diodes (LEDs), shown operatively coupled to the timer (430). In an exemplary embodiment, the array of illuminating elements may be a virtual interface with a visual display configured to present the array. In an exemplary embodiment, and as shown here, the timer (430) includes a visual display to convey time, such as time elapsed or time remaining. For example, in an embodiment, the timer (430) starts counting when the exercise begins, with the time continuing to increment until each of the secondary units in the locale have been activated (e.g. received an actuating force) in accordance with their objective grouping. In another embodiment, the timer (430) is programmed for a set time interval and counts down until either each of the secondary units have been activated in accordance with their objective groupings or time has expired. Details of the timer (430) and its functional association with the secondary units, and in an embodiment the visual display associated with the timer, are described below. In an exemplary embodiment, the functionality of the primary unit (410) may be exemplified or embodied in a computer, such as, but not limited to, a desktop computer, a laptop computer, a smart phone, etc.

As described above, each secondary unit is operatively coupled to the primary unit. The array of illuminating elements in the display (432) is configured as an interface or a display to convey the operative state of the operatively coupled secondary units. As shown by way of example, the array is provided with an arrangement of illuminating elements, which in an embodiment may be an array of light emitting diodes. In the example shown herein, the illuminating elements are arranged in pairs, although this embodiment of the arrangement should not be considered limiting. In an exemplary embodiment, each of the secondary units is individually assigned to a position within the display (432), with each illuminating element, hereinafter referred to as a light-emitting diode (LED), addressed to a specific secondary unit. For example, in an embodiment, the first address of secondary unit$_0$ (130) is assigned to LED 0 (442) and second address of secondary unit$_1$ (132) is assigned to LED 1 (444). In an embodiment where the primary unit (410) is embodied in a computer, desktop, laptop, smart phone, etc., the array of illuminating elements may be exhibited on a corresponding visual display. Accordingly, each secondary unit is configured with a unique address assigned to a position, e.g. image location, within the display (440).

A signal received from one of the secondary units is visually depicted in its assigned position in the display (440). Receipt of the signal is conveyed by a changed visual state of the LED or displayed image in the visual display (440) assigned to the unique address of the corresponding secondary unit. In an exemplary embodiment, if a pair of LEDs is visually illuminated in color representing or assigned to an activated state, this is an indication that a matching pair of secondary units has been activated. In an embodiment, a sound is emitted via the sound card when a matching pair of secondary units have been activated, thereby providing an audible cue of the match. As described above, in an embodiment the display (440) may be virtual presenting an abstract or non-abstract arrangement of the secondary units, with each position in the array being addressed to a specific secondary unit. Accordingly, whether physical or virtual, the display (440) is configured to visually convey formation or matches or non-matches among the secondary units operatively coupled to the primary unit.

The timer (430) is shown herein operatively coupled to the display (432), and the light emitting elements therein. The timer (430) functions as an element to measure elapsed time between the start of a training trial to when a last matching secondary unit is found, e.g. actuated. Accordingly, the timer (430) is configured to count up and track time for completion of an exercise in finding the secondary units, whether individually, in pairs, or groups, or the timer (430) may be configured to count down. In an exemplary embodiment, the time interval associated with the timer (430) is configurable with respect to counting up or down, as well as time interval parameters with respect to counting up or down. In an embodiment, the primary unit (410) may be configured with additional or alternative components to support and enable the functionality of the primary unit (410), and as such should not be limited to the components shown and described herein. For example, in an embodiment, the primary unit may be embodied in a visual display to convey aspects of the secondary unit, such as indicating which units are active- or yet to be grouped or inactive—in that they have already been successfully grouped, aspects of the timer, etc. Accordingly, the primary unit (410) functions to interface with the secondary units individually as well as in pairs or groups.

Figure 5:
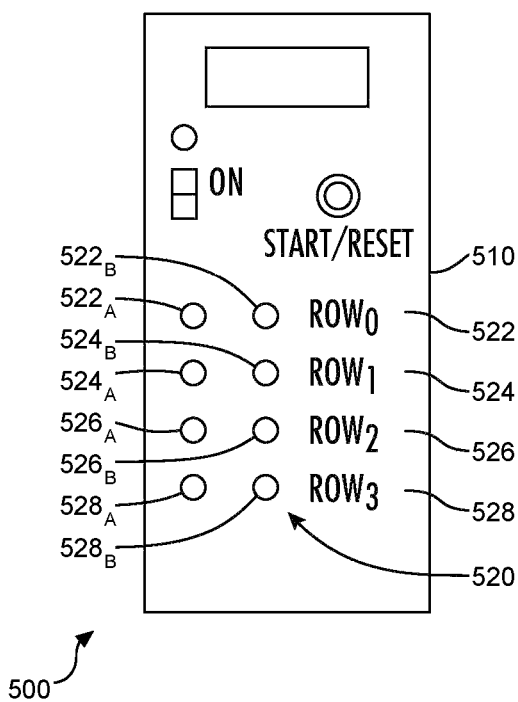
FIG. 5 depicts a diagram illustrating an embodiment of a primary unit.

Referring to FIG. 5, a diagram (500) is provided to illustrate an embodiment of a primary unit, also referred to herein as a control unit. As shown, the primary unit is enclosed or represented in a physical body (510). In an embodiment, the primary unit (510) may also function or be referred to as an interface, such as but not limited to a visual display with a virtual interface. In an embodiment, the primary unit and corresponding display may be in the form of a virtual interface. In the example shown herein, the primary unit (510) is provided with a plurality of indicators, with the functionality of these indicators described below. The primary unit (510) is shown herein separated from the primary unit (410). In an embodiment, and as shown in FIG. 4, the primary unit (510) may be attached to or incorporated within the primary unit (400). The primary unit (510) functions as an interface to convey an operative state of the addressed secondary units. In an embodiment, the primary unit (510) functions to receive wireless signals to individually from the secondary units. In another embodiment, the primary unit can also communicate to the secondary units either collectively or individually in order to turn them on, interrogate them for a battery life, change their audio output volume or to change their modes of operation in some way. In an exemplary embodiment, the primary unit (510) may be incorporated into a computer, tablet or smartphone device.

As shown, the primary unit (510) is provided with an array of indicators (520). In the example shown, the secondary units are configured in pairs, and the indicators (520) are arranged in an array with an alignment of two indicators per row. In an embodiment, the indicators (520) may be in the form of images corresponding to groups of secondary units. Each indicator in the array is individually addressable. In an exemplary embodiment, each indicator in the array (520) is addressed to a separate secondary unit. In the example shown herein, the array (520) is shown with four rows of indicators with two indicators per row. This arrangement of the array of indicators (520) is merely an example, and in an embodiment, the array of indicators (520) may be configured with a different physical layout or arrangement. In an embodiment where the primary unit (510) is incorporated in a visual display, the array of indicators (520) may be arranged and displayed according to the pairing or grouping of secondary units. Based on the example arrangement, the array (520) is shown with four rows of indicators, shown herein as $row_0$ (522), $row_1$ (524), $row_2$ (526), and $row_3$ (528). $Row_0$ (522) is shown with indicators ($522_A$) and ($522_B$), $row_1$ (524) is shown with indicators ($524_A$) and ($524_B$), $row_2$ (526) is shown with indicators ($526_A$) and ($526_B$), and $row_3$ (528) is shown with indicators ($528_A$) and ($528_B$). The arrangement of indicators, or in an embodiment an arrangement of images, functions as a status indicator to the secondary units. In an exemplary embodiment, each indicator in the array (520) may be subject to be individually illuminated based on a communication or signal received from a secondary unit addressed to the individual indicator. For example, if the secondary unit is assigned to indicator ($522_B$), the indicator would be illuminated to exhibit a visual cue in response to actuation of the addressed secondary unit. Accordingly, the arrangement of indicators or images visually exhibit which individual, pairs, or groups of secondary units have been aggregated or matched, and which secondary units still need to be aggregated or matched for completion of the corresponding exercise.

The array (520) may be associated with a program for identifying matching secondary units. For example, matching secondary units may generate the same or complimentary sounds when activated. If a matching secondary unit is activated, then the addressed indicator will be activated and illuminated in the array with the corresponding secondary unit(s). Accordingly, the primary unit (510) may be separate from or integrated with the primary unit, and functions to interface with the secondary units with respect to a visual and functional interface.

With respect to the virtual display embodiment, the primary unit is enclosed or represented in a visual display to project or otherwise convey or display a plurality of indicators, with the functionality of these indicators described above. The visual display functions as an interface to convey an operative state of the addressed secondary units. The visual display conveys the arrangement of the secondary units, individually, in pairs, or in groups. In an exemplary embodiment, the visual display conveys changes to the activation or de-activation of one or more of the functional units. For example, a first mode of operation may be directed to activation of secondary units on an individual basis, a second mode of operation may be directed to activation of secondary units in pairs, a third mode directed at activation in groups, etc. In an exemplary embodiment, a mode of operation is selected, and the visual display is configured to present an organized layout of the secondary units based on the selected mode. In an exemplary embodiment, the secondary units may each have a different physical appearance on the visual display and/or a color to convey the state of the corresponding secondary unit. Accordingly, as with the physical primary unit (510), each secondary unit represented in the visual display is individually addressable.

Figure 6:
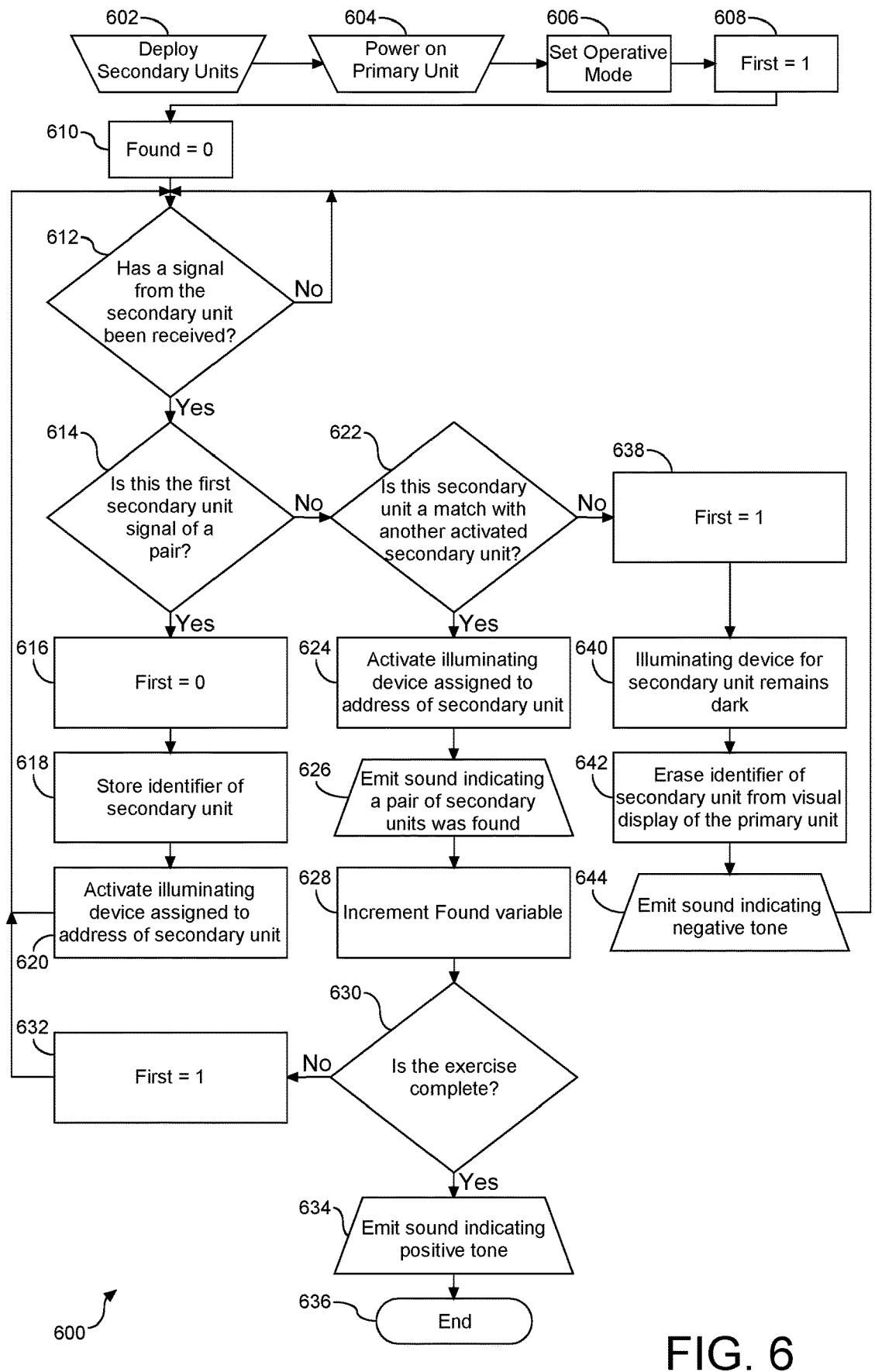
FIG. 6 depicts a flow chart illustrating an embodiment of a process for utilizing the primary and secondary units in an interactive format.

Referring to FIG. 6, a flow chart (600) is provided to illustrate an embodiment of a process for utilizing the primary and secondary units in an interactive format. As shown and described above, the primary and secondary units are operatively coupled. A plurality of the secondary units is placed, or in an embodiment deployed, in a defined physical space (602). In an embodiment, a minimum of four secondary units are placed in the physical space. Each of the secondary units is to an active or on state, e.g. ready to be actuated or receive a physical force. In an embodiment, the secondary units are configured to receive a force, such as a tapping from a white cane. A primary unit, which is operatively coupled to the secondary units, is activated (604), e.g. powered on. In an embodiment, the primary unit may be referred to as a control unit. In an embodiment, the primary unit is positioned within the confines of the physical space where the secondary units are deployed or positioned. Similarly, in an exemplary embodiment, the primary unit is in a separate physical space remote from the secondary units.

As described above, the system as a whole may be configured to support two or more modes of operation. Following step (604), the operative mode is selected or otherwise conveyed (606). Examples of the operative mode include, but are not limited to, an individual mode, a pair mode, and group mode, etc. Following step (606), the physical components of the primary and secondary units are set to an interactive mode. A variable, First, is assigned to the integer one and represents the first secondary unit in a pairing of secondary units (608), and another variable, Found, which represents secondary units in the exercise that have been subject to actuation, is initialized (610). In an embodiment, and as shown herein, the initialization of the Found variable is set to zero. In the embodiment shown and described herein, the second mode, e.g. pair mode, is selected and as such the secondary units are arranged in pairs. Similar logic may be applied to a different mode of operation. In an embodiment in which the secondary units are arranged in pairs, or in an embodiment in groups of three or more, each unit in the pair or group is configured to emit the same or complimentary sounds. Each of the secondary units is individually configured or programmed to emit an audible sound when activated, with an embodiment of the activation being in the form of receipt of actuation stimulus or force. Accordingly, the secondary units may be subject to individual activation through receipt of pressure, vibration, etc.

The secondary units are individually programmed to emit sound that is audible, e.g. able to be heard. At such time as one of the secondary units is activated and a sound is emitted, and a signal is communicated to the primary unit. In an exemplary embodiment, the signal conveys the address of the associated secondary unit. Based upon an actuation and the sound emission, it is determined if a corresponding signal to the primary unit has been received (612). A positive response to the determination is followed by a second determination to ascertain if the signal corresponds to the first secondary unit in a pair of secondary units (614). A positive response to the determination at step (614) is followed by changing the setting of the variable First to zero (616) and storing the identifier or address of the corresponding secondary unit (618). In addition, an LED or illuminating device in the primary unit that is assigned to the address of the secondary unit is illuminated (620). Thereafter, the process returns to step (612) at such time as the same or a different secondary unit is subject to an actuation.

If at step (614) is it determined that the secondary unit being evaluated is not the first secondary unit in the pair of secondary units, it is then determined if the secondary unit being evaluated matches with a previously activated secondary unit (622). A positive response to the determination at step (622) is following by illuminating the LED or illumination device in the primary unit that is assigned to the address of the secondary unit (624). In addition, a sound is projected to convey that a pair of secondary units has been found (626), and the variable Found is incremented (628). In an embodiment, the sound projected at step (626) is a positive or happy sound. Following step (628), another determination is conducted to ascertain if the exercise is completed (630), e.g. if each of the deployed secondary units have been actuated in accordance with a prescribed objective relationship of being matched or grouped. A negative response to the determination at step (630) is followed by assigning the variable First to the integer one (632). Thereafter, the process returns to step (612) at such time as the same or a different secondary unit is subject to an actuation. A positive response to the determination at step (630) is followed by the primary unit emitting a sound conveying a positive atmosphere (634), such as a happy sound, and is followed by conclusion of the exercise (636). In an embodiment, a timer may be invoked to track time for completion of the exercise or game, and the conclusion of the exercise at step (636) is exemplified in the stopping of the timer. In an exemplary embodiment, the sound emitted at step (634) indicates that the exercise has been successfully completed. Similarly, in an embodiment, at or about the conclusion of the exercise at step (636), the visual display of the primary unit exhibits an illumination of each illuminating device assigned to an address associated with a corresponding secondary unit. In an embodiment in which a timer is employed, the primary unit may also exhibit the time elapsed for completion of the exercise or game.

Returning to the evaluation at step (622), a negative response is an indication that the secondary unit subject to the actuation does not match with a previously actuated secondary unit. In this scenario, the variable First is assigned to the integer one (638) and the LED or illumination device associated with secondary unit is dark, e.g. not illuminated, (640), and a sound conveying a negative tone is emitted (644). Following step (644) or a negative response to the determination at step (612), the process returns to step (612) at such time as the same or a different secondary unit is subject to an actuation.

Figure 7:
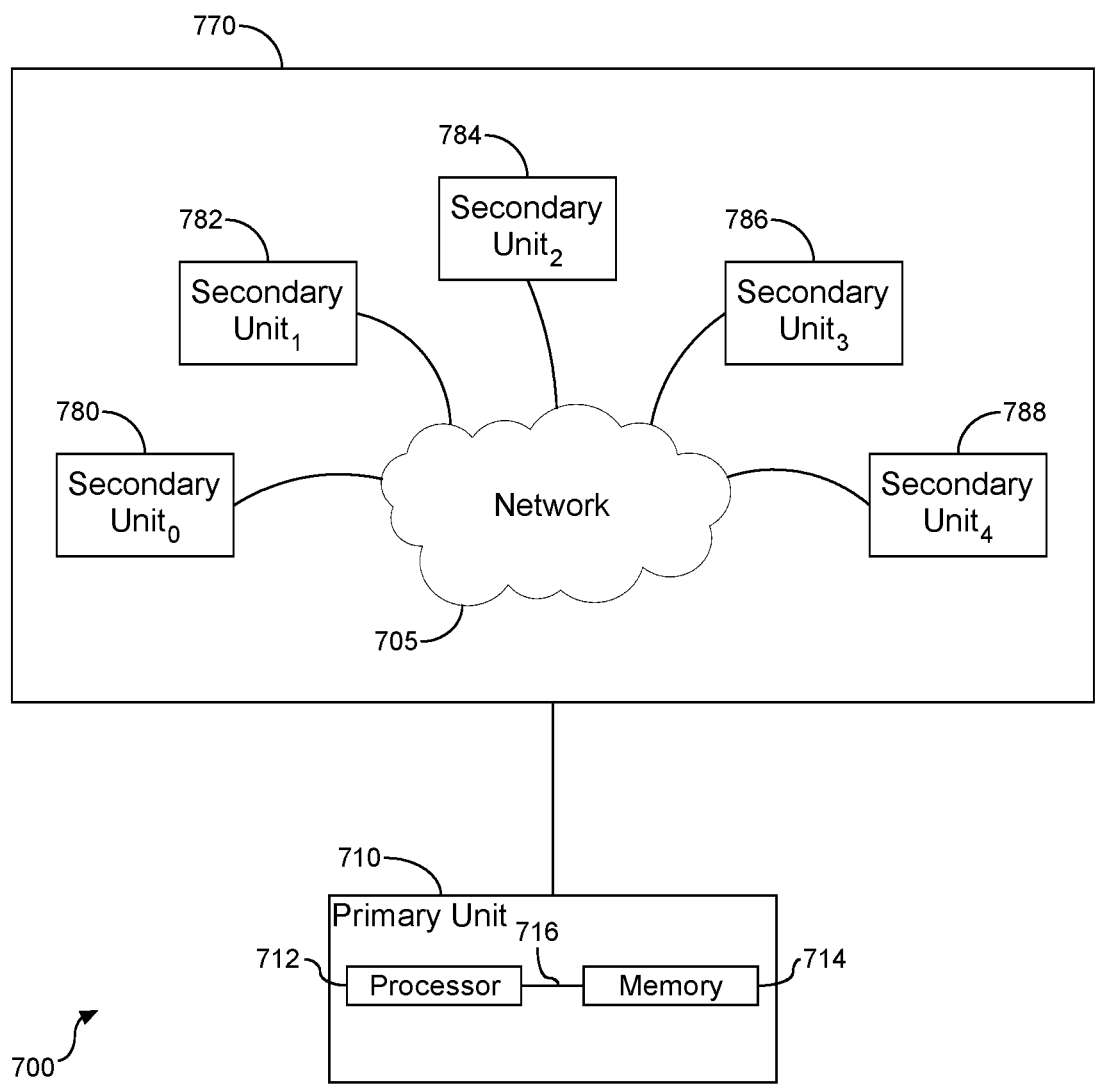
FIG. 7 depicts a diagram of an embodiment of a system of the primary and secondary units.

Referring to FIG. 7, a diagram of an embodiment of a system (700) of the primary and secondary units is depicted. As shown, a primary unit (710) is provided in communication with a plurality of secondary units (780), (782), (784), (786) and (788) across a network connection, e.g. computer network, (705). Although only four secondary units are shown, this quantity is for exemplary purposes and should not be considered limiting. The configuration of the primary and secondary units is described above. In an exemplary embodiment, the primary unit (710) is configured with a processing unit (712), e.g., a computer processor, in communication with memory (714) across a bus (716). The primary unit (710) is shown in a first locale (720) remote or separate from a second locale (770) in which the secondary units are shown.

The primary unit (710) is operatively coupled to the network (105) to support both individual and grouping interaction and communication with the secondary units (780), (782), (784), and (786). In an exemplary embodiment, the secondary units (780), (782), (784), and (786) communicate with each other and with other devices or components via one or more wired and/or wireless data communication links, where each communication link may comprise one or more of wires, routers, switches, transmitters, receivers, or the like. In this networked arrangement, the primary unit (710) and the network connection (705) enable communication detection, recognition, and resolution. Other embodiments of the primary unit (710) may be used with components, systems, sub-systems, and/or devices other than those that are depicted herein.

The primary unit (710) operates in a dynamic manner, i.e., in real-time, to collect interactive data associated with actuation of the secondary units. Input received by the primary unit (710) from one or more of the secondary units individually subject to actuation is used to dynamically determine activation. In an embodiment, a secondary unit may have been activated, with the activation registered with the primary unit, and then subject to a second actuation, in which case the primary unit (710) and corresponding logic would determine that state of the secondary unit and generate an audible cue to convey that this secondary unit is already in an active state. In an exemplary embodiment, the primary unit (710) may send a signal across the network connection (705) to the subject secondary unit to convey the audible cue.

Figure 8:
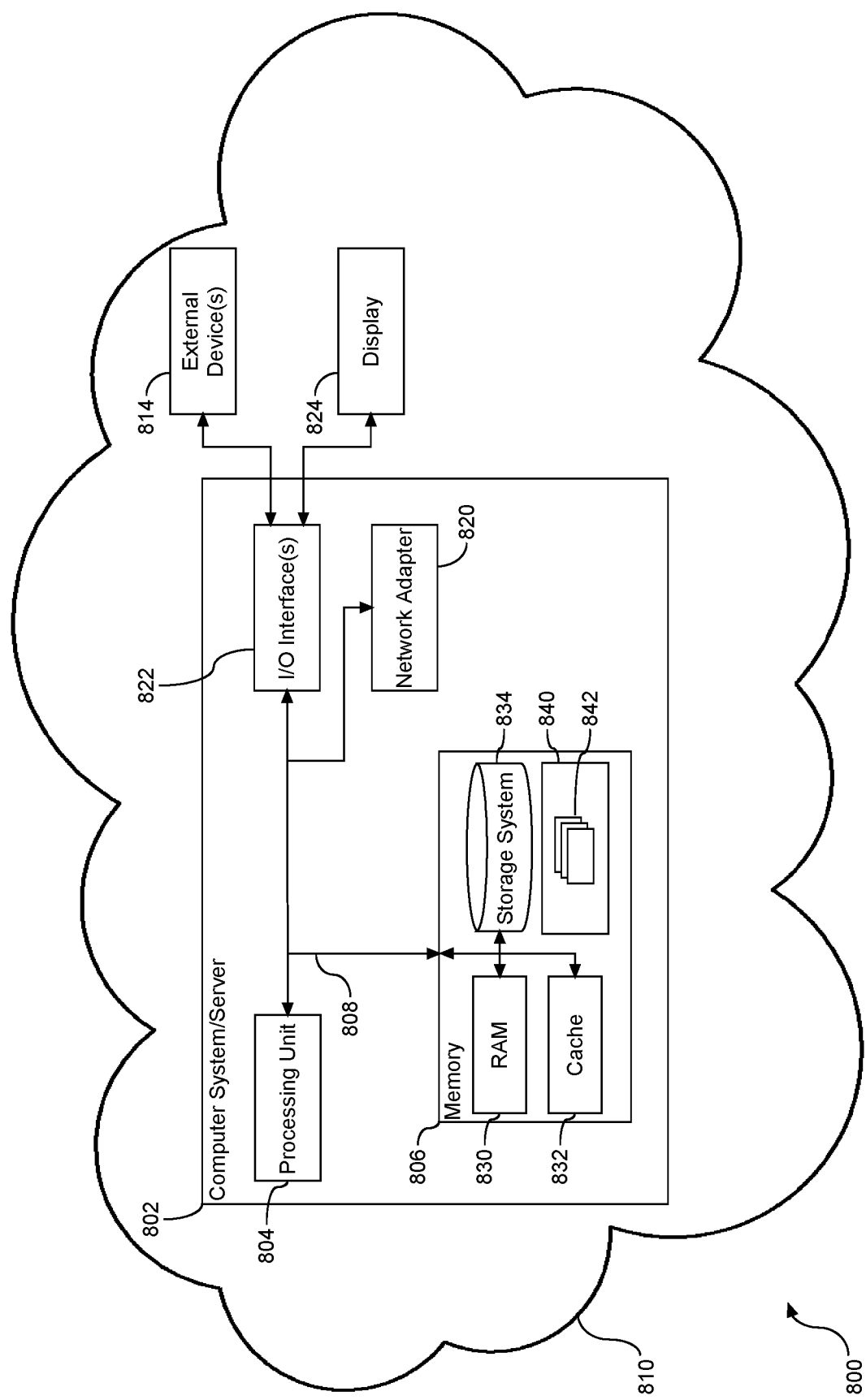
FIG. 8 depicts a block diagram illustrating an example of a computer system/server of a cloud based support system, to implement the system and processes described above with respect to FIGS. 1-7.

Embodiments shown and described herein may be utilized as a form of interactive entertainment, such as a live version of a matching game, or in an embodiment utilized to learn and understanding the physical parameters of the area in which the secondary units are positioned. Aspects of the primary unit (710) and its associated functionality may be embodied in a computer system/server in a single location, or in an embodiment, may be configured in a cloud based system sharing computing resources. With reference to FIG. 8, a block diagram (800) is provided illustrating an example of a computer system/server (802), hereinafter referred to as a host (802) in communication with a cloud based support system (810), to implement the system, tools, and processes described above in FIGS. 1-7. In an embodiment, host (802) is a node of a cloud computing environment. The host (802) is operational with numerous other general purpose or special purpose computing system environments or configurations. Examples of well-known computing systems, environments, and/or configurations that may be suitable for use with host (802) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The host (802) may be described in the general context of computer system-executable instructions, such as program modules, being executed by a computer system. Generally, program modules may include routines, programs, objects, components, logic, data structures, and so on that perform particular tasks or implement particular abstract data types. The host (802) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the host (802) is shown in the form of a general-purpose computing device, and is configured to be operatively coupled to the secondary units shown in FIG. 7 as (752), (754), (756), and (758). The components of host (802) may include, but are not limited to, one or more processors or processing units (804), e.g. hardware processors, a system memory (806), and a bus (808) that couples various system components including system memory (806) to processor (804). The bus (808) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The host (802) typically includes a variety of computer system readable media. Such media may be any available media that is accessible by the host (802) and it includes both volatile and non-volatile media, removable and non-removable media.

The system memory (806) can include computer system readable media in the form of volatile memory, such as random access memory (RAM) (830) and/or cache memory (832). By way of example only, storage system (834) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus (808) by one or more data media interfaces.

Program/utility (840), having a set (at least one) of program modules (842), may be stored in the system memory (806) by way of example, and not limitation, as well as an operating system, one or more application programs, other program modules, and program data. Each of the operating systems, one or more application programs, other program modules, and program data or some combination thereof, may include an implementation of a networking environment. Program modules (842) generally carry out the functions and/or methodologies of embodiments to support the dynamic and interactive platform with the secondary units The host (802) may also communicate with one or more external devices (814), such as a keyboard, a pointing device, etc.; a display (824); one or more devices that enable a user to interact with the host (802); and/or any devices (e.g., network card, modem, etc.) that enable the host (802) to communicate with one or more other computing devices, including but not limited to the secondary units. Such communication can occur via Input/Output (I/O) interface(s) (822). Still yet, the host (802) can communicate with one or more networks such as a local area network (LAN), a general wide area network (WAN), and/or a public network (e.g., the Internet) via network adapter (820). As depicted, the network adapter (820) communicates with the other components of the host (802) via the bus (808). In an embodiment, one or more of the secondary units is in communication with the host (802) via the I/O interface (822) or via the network adapter (820). It should be understood that although not shown, other hardware and/or software components could be used in conjunction with the host (802). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (806), including RAM (830), cache (832), and storage system (834), such as a removable storage drive and a hard disk installed in a hard disk drive.

Computer programs (also called computer control logic) are stored in memory (806). Computer programs may also be received via a communication interface, such as network adapter (820). Such computer programs, when run, enable the computer system to perform the features of the present embodiments as discussed herein. In particular, the computer programs, when run, enable the processing unit (804) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

The functional aspects of the system described in this specification may be implemented in programmable hardware devices such as field programmable gate arrays, programmable array logic, programmable logic devices, or the like. The functional aspects may also be implemented in software for processing by various types of processors. Executable code may, for instance, comprise one or more physical or logical blocks of computer instructions which may, for instance, be organized as an object, procedure, function, or other construct. Nevertheless, the executables elements need not be physically located together, but may comprise disparate instructions stored in different locations which, when joined logically together, comprise the functional aspects and achieve the stated purpose of the functional aspects.

Indeed, executable code could be a single instruction, or many instructions, and may even be distributed over several different code segments, among different applications, and across several memory devices. Similarly, operational data may be identified and illustrated herein within the primary or secondary units, and may be embodied in any suitable form and organized within any suitable type of data structure. The operational data may be collected as a single data set, or may be distributed over different locations including over different storage devices, and may exist, at least partially, as electronic signals on a system or network.

In an embodiment, the secondary units represent animals arranged in pairs, with each pair emitting the same or complementary sounds. When each of the pairs of secondary units has been found, a corresponding ark of animals is complete. The following is pseudo code to support and enable the process shown and described in FIG. 6 with the secondary pairs individually referred to as animals:

\* \* \* \* \* \* \* Initializing variables
'Start/Reset' button is pressed
Timervalue=0
Timermode=1' mode of timer. Running or not running
Lastcaught
Animalindex
Checkpair
First=1' Indicates whether the first or second finding process is underway.
Caughtcount=0' when it reaches 4 game is over and timer stops.
j=4: i=2
do while j>0
  do while i>2
    Animal (j,i)=0' j points to Animal, i points to LED right or left $i=i-1$ loop
arkAnimal (j)=0' points to completed Animal pairs.

$j=j-1$ loop
'
caught(1)=1:Caught(8)=15:Caught(2)=2:Caught(7)=14'
  These numbers allow pairs to be matched (pairs sum to 16)
Caught(3)=3:Caught(6)=13:Caught(4)=4:Caught(5)=12

```
'* * * * * * * *
'* * * * * * ** Received a message
do while timermode=1
' within this loop we wait for messages from Animals
    if AnimalID>0 then inbox=1 else inbox=0: end if '
    Indicate a message has been received
    do while inbox=1
    ' within this loop we process messages from Animals
    Select case AnimalID ' Assign an index to the Animal
        calling
        Case is=#QQQQ1
        Animalindex=1
        case is=#QQQQ2
        Animalindex=2
        case is=#QQQQ3
        Animalindex=3
        case is=#QQQQ4
        Animalindex=4
        case is=#QQQQ5
        Animalindex=5
        case is=#QQQQ6
        ANIMALINDEX=6
        CASE IS=#QQQQ7
        ANIMALINDEX=7
        CASE IS=#QQQQ8
        ANIMALINDEX=8
    end select
If arkAnimal(Animalindex)=0 Goto 100' if the Animal
pair is already on the ark skip it.
'
    Select Case First ' The Animal find was either first or
        second of a pair.
        Case is=1
        lastcaught=Animalindex: Animal (Animalindex, 1)=1:
            first=0' light first LED for the Animal and indicate
            that we are now looking for second of the pair.
        Case is=0
        Checkpair=caught(lastcaught)+caught(Animalindex)
        If Checkpair=16 then
        light both LEDs for this Animal: Animal (Animalindex,
            2)=1
        caughtcount=caughtcount+1:    ArkAnimal(Animalin-
            dex)=1: first=1:lastcaught=0
        else
        Animal (lastcaught,1)=0' it was not a match so zero the
            LED for the previously caught Animal.
        first=1:lastcaught=0
        end if
        End Select
        Sub ManageLEDs( )
        100' Animal pair is already caught (on ark)
        ' check for end of game
        Do while caughtcount=4
        timermode=0'
        beep: flash LEDs
        caughtcount=0
        loop
loop' continue to look for Animals
```

Figure 9:
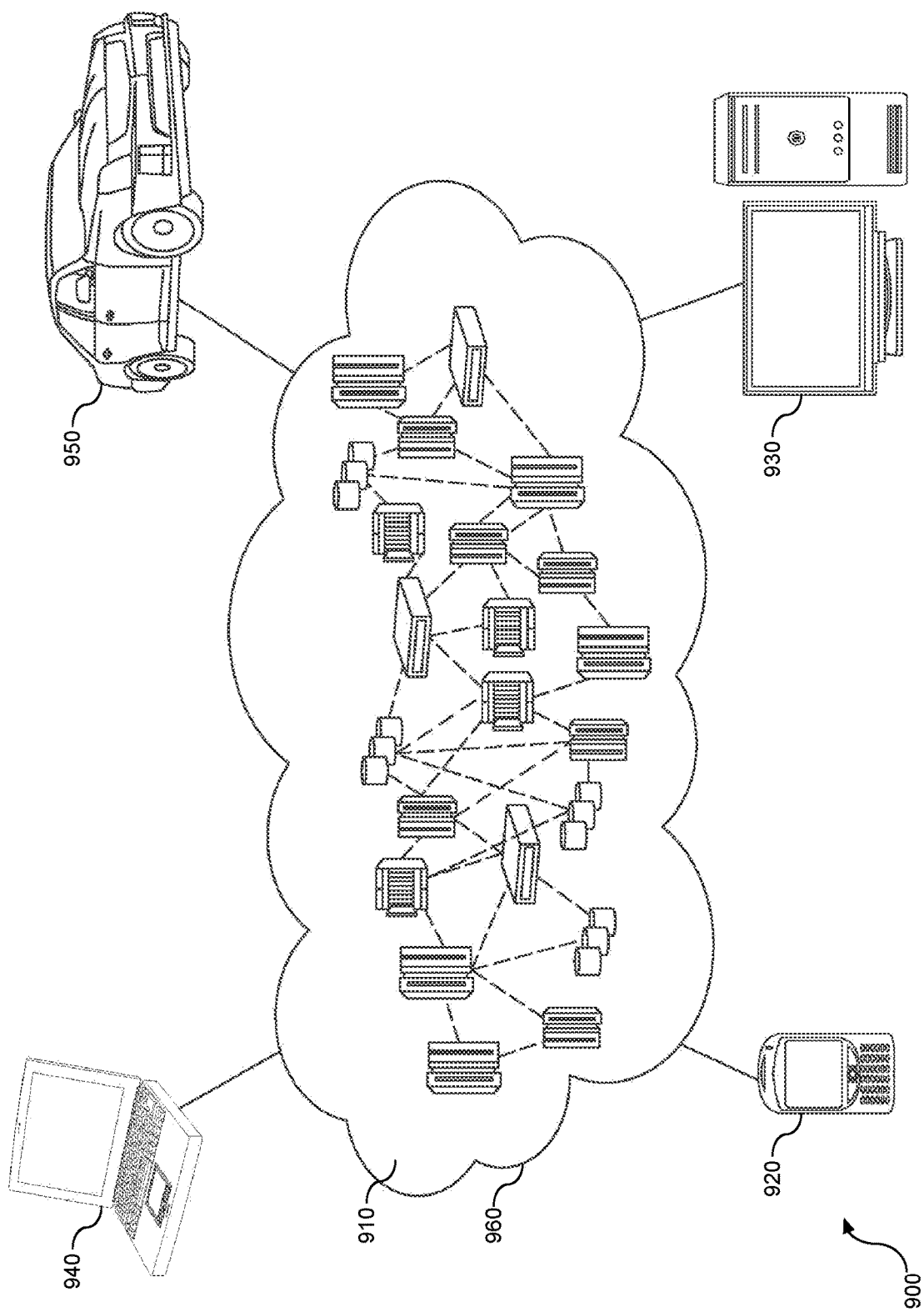
FIG. 9 depicts a block diagram illustrating a cloud computer environment.

Referring now to FIG. 9, an illustrative cloud computing network (900). As shown, cloud computing network (900) includes a cloud computing environment (960) having one or more cloud computing nodes (910) with which local computing devices used by cloud consumers may communicate. Examples of these local computing devices include, but are not limited to, personal digital assistant (PDA) or cellular telephone (920), desktop computer (940), laptop computer (930), and/or automobile computer system (950). Individual nodes within nodes (910) may further communicate with one another. They may be grouped (not shown) physically or virtually, in one or more networks, such as Private, Community, Public, or Hybrid clouds as described hereinabove, or a combination thereof. This allows cloud computing environment (900) to offer infrastructure, platforms and/or software as services for which a cloud consumer does not need to maintain resources on a local computing device. It is understood that the types of computing devices (920-950) shown in FIG. 9 are intended to be illustrative only and that the cloud computing environment (960) can communicate with any type of computerized device over any type of network and/or network addressable connection (e.g., using a web browser).

Figure 10:
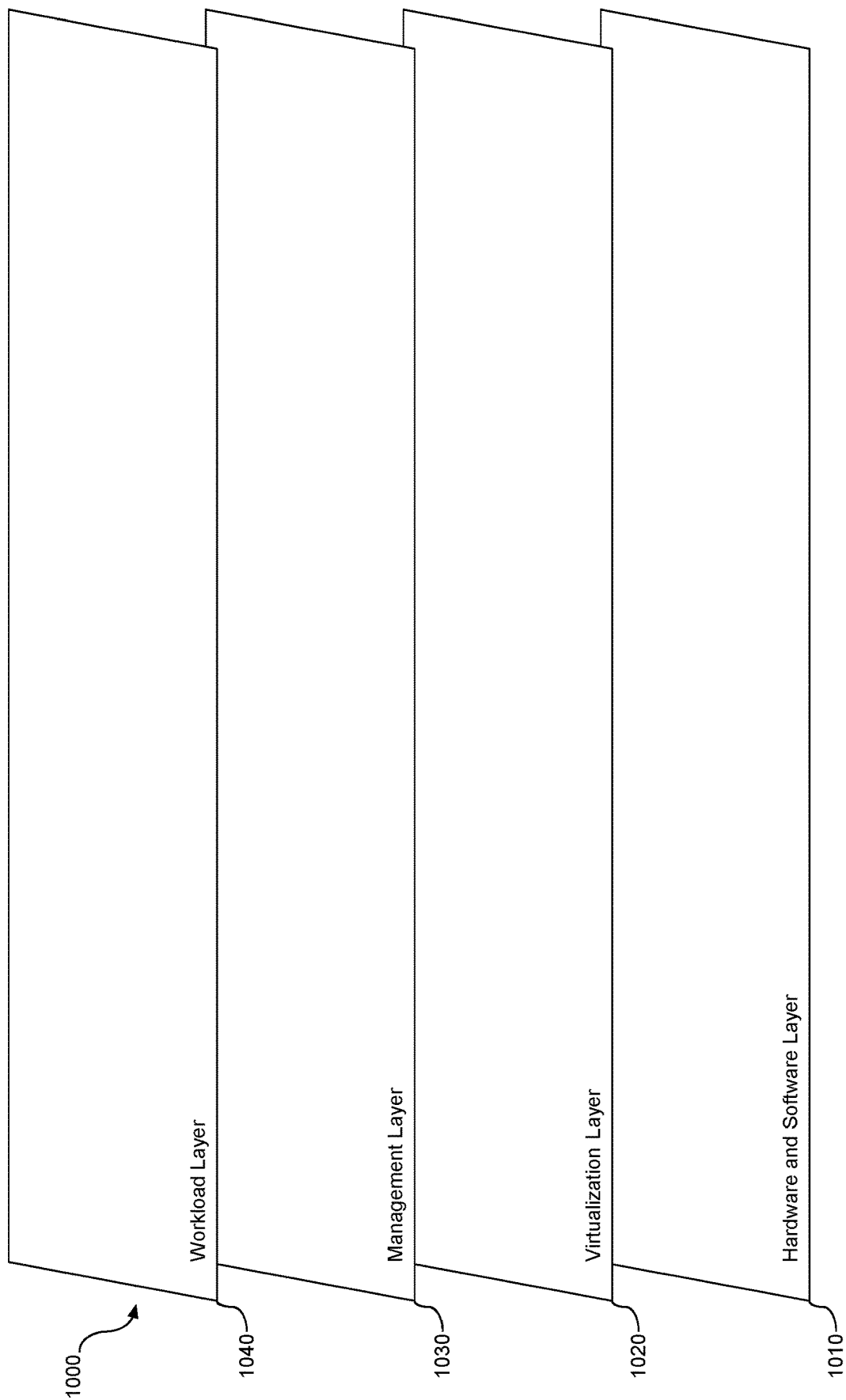
FIG. 10 depicts a block diagram illustrating a set of functional abstraction model layers provided by the cloud computing environment.

Referring now to FIG. 10, a set of functional abstraction layers (1000) provided by the cloud computing network of FIG. 9 is shown. It should be understood in advance that the components, layers, and functions shown in FIG. 10 are intended to be illustrative only, and the embodiments are not limited thereto. As depicted, the following layers and corresponding functions are provided: hardware and software layer (1010), virtualization layer (1020), management layer (1030), and workload layer (1040).

The hardware and software layer (1010) includes hardware and software components. Examples of hardware components include storage devices, networks, and networking components. Examples of software components include network application (server) software, and database software.

Virtualization layer (1020) provides an abstraction layer from which the following examples of virtual entities may be provided: virtual servers; virtual storage; virtual networks, including virtual private networks; virtual applications and operating systems; and virtual clients.

In an example, management layer (1030) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1040) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and operability of the primary and secondary units.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles. As used herein, the term "and/or" means either or both (or one or any combination or all of the terms or expressed referred to).

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to support inter-operability of the primary and secondary units.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the operation of the system supports and enables locating and tracking objects in the form of secondary units, as well as develop an ability to survey and map physical spaces. Accordingly, the scope of protection of the embodiments is limited only by the following claims and their equivalents.

What is claimed is:

1. A system comprising:
a first functional unit configured to convey first contact feedback as a first output in response to receipt of a first physical actuation from a non-operatively coupled device, wherein the non-operatively coupled device is a walking support structure being a cane or comparable device, and the first functional unit further configured to selectively emit the first output in response to the first physical actuation, wherein the first output is a first audible output;
a second functional unit configured to convey second contact feedback as a second output in response to receipt of a second physical actuation from the non-operatively coupled device, the second functional unit further configured to selectively emit the second output in response to the second physical actuation, wherein the second output is a second audible output;
the first functional unit further comprises a first switch and the second functional unit further comprises a second switch, each of the first and second switches individually configured with an inactive state and active state, and further comprising placement of the first and second switches in an active state to operatively couple and register the first and second functional units to a primary unit;
an assignment of the first functional unit to a first group configured with a first group audible output and the second functional unit to a second group configured with a second group audible output different from the first group audible output; and the primary unit configured to receive and evaluate a first signal and a second signal, the first signal corresponding to the selectively emitted first audible output and a first address associated with the emitted first output and the second signal corresponding to the selectively emitted second audible output and a second address associated with the emitted second output, the primary unit to determine a match or non-match of the first and second outputs, wherein the match of the selectively emitted outputs includes issuance of a cue, the cue comprising an audible format, a visual format, or a combination thereof, the issued cue configured to convey an objective condition between the first and second audible outputs.

2. The system of claim 1, wherein the objective condition comprises formation of the match or a non-match of the first and second audible outputs.

3. The system of claim 1, further comprising a visual display operatively coupled to the primary unit, the visual display configured to visually convey visual output in alignment with the objective condition.

4. The system of claim 1, wherein the first functional unit is a first physical hardware unit including a first body and a first cover configured to enclose the first body, the first cover including a resilient material configured to receive the first actuation, and wherein the second functional unit is a second physical hardware unit including a second body and a second cover configured to enclose the second body, the second cover including the resilient material configured to receive the second actuation.

5. The system of claim 4, wherein the first functional unit includes the first address and the second functional unit includes the second address different from the first address, the first address configured to be communicated to the primary unit in response to the first actuation and the second address configured to be communicated to the primary unit in response to the second actuation.

6. The system of claim 5, further comprising the primary unit configured with logic to evaluate the received addresses to identify formation of the match or non-match between the first and second outputs.

7. The system of claim 6, further comprising in response to identification of attainment of the objective condition, the primary unit configured to logically remove the functional units from further consideration.

8. The system of claim 1, further comprising the primary unit configured to identify a final objective condition to convey attainment of the final objective condition.

9. The system of claim 8, further comprising a timer operatively coupled to the primary unit, the timer configured to count an elapsed time until identification attainment of the final objective condition.

10. The system of claim 8, further comprising a final audible cue configured to be emitted by the primary unit in response to attainment of the final objective condition.

11. A computer program product comprising a computer readable storage medium having program code embodied therewith, the program code executable by a processor to:
convey first contact feedback as a first output in response to receipt of a first physical actuation from a non-operatively coupled device, wherein the non-operatively coupled device is a walking support structure being a cane or comparable device, of a first functional unit, and the first functional unit further configured to selectively emit the first output in response to the first physical actuation, wherein the first output is a first audible output;
convey second contact feedback as a second output in response to receipt of a second physical actuation of a second functional unit from the non-operatively coupled device, the second functional unit further configured to selectively emit the second output in response to the second physical actuation, wherein the second output is a second audible output;
the first functional unit further comprising a first switch and the second functional unit further comprising a second switch, each of the first and second switches individually configured with an inactive state and active state, and further comprising placement of the first and second switches in an active state to operatively couple and register the first and second functional units to a primary unit;
assign the first functional unit to a first group configured with a first group audible output and the second functional unit to a second group configured with a second group audible output different from the first group audible output; and
receive and evaluate a first signal and a second signal, the first signal corresponding to the selectively emitted first output and a first address associated with the emitted first output and the second signal corresponding to the selectively emitted second output and a second address associated with the second output to determine a match or non-match of the first and second outputs, wherein the match of the selectively emitted outputs includes issuance of a cue, the cue comprising an audible format, a visual format, or a combination thereof, the issued cue configured to convey an objective condition between the first and second audible outputs.

12. The computer program product of claim 11, wherein the objective condition comprises formation of the match or the non-match of the first and second audible outputs.

13. The computer program product of claim 11, further comprising a visual display operatively coupled to the program code, the visual display configured to visually convey visual output in alignment with the objective condition.

14. The computer program product of claim 11, wherein the first functional unit includes the first address and the second functional unit includes the second address different from the first address, and further comprising the program code configured to convey the first and second addresses to the primary unit in response to the first actuation and the second actuation, respectively.

15. The computer program product of claim 14, further comprising program code configured to evaluate the received first and second addresses to identify formation of the match or non-match between the first and second outputs.

16. The computer program product of claim 15, further comprising in response to identification of attainment of the objective condition, the program code configured to logically remove the functional units from further consideration.

17. The computer program product of claim 11, further comprising program code configured to identify a final objective condition to convey attainment of the final objective condition.

18. The computer program product of claim 17, further comprising program code configured to count an elapsed time until identification attainment of the final objective condition.

19. The computer program product of claim 17, further comprising a final audible cue configured to be emitted by the primary unit in response to attainment of the final objective condition.

20. The system of claim 1, wherein the first and second functional units are operatively coupled to the primary unit individually, in pairs, or in groups.

21. The system of claim 1, further comprising an assignment of the first functional unit and the second functional unit to a first group configured with a first group audible output, wherein first audible output and the second audible output are the first group audible output.

* * * * *